No. 751,467. PATENTED FEB. 9, 1904.
F. B. COREY.
MOTORMAN'S VALVE.
APPLICATION FILED JUNE 18, 1903.
NO MODEL. 3 SHEETS—SHEET 1.
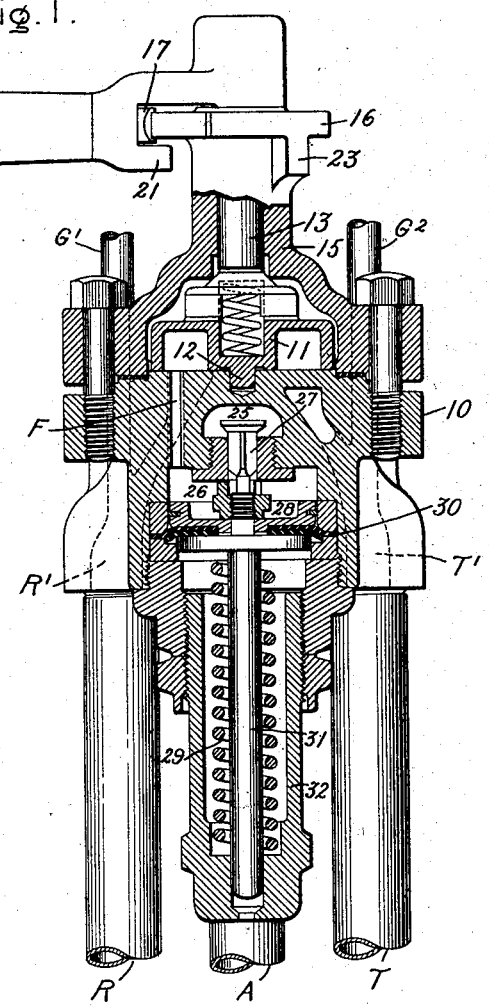
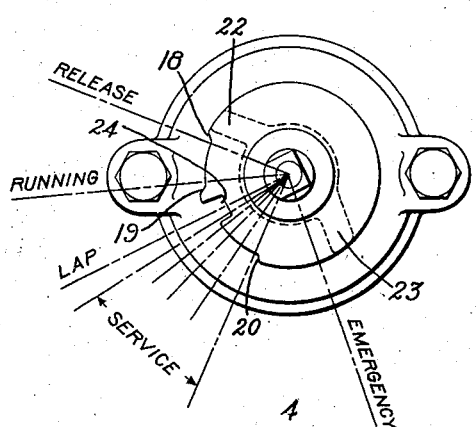
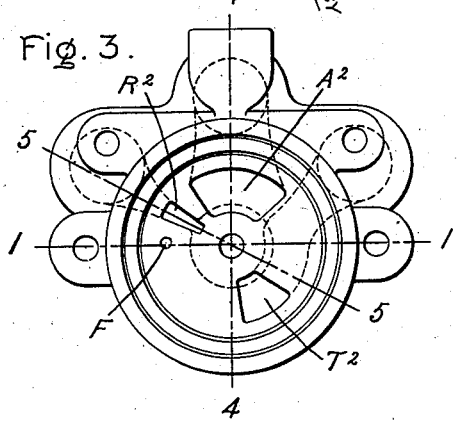
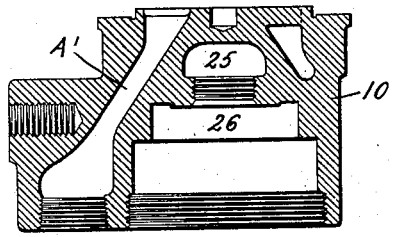
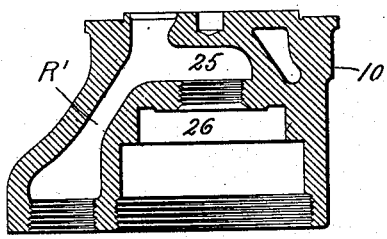
Witnesses:
George H. Tilden.
Helen Orford.
Inventor:
Fred B. Corey.
by Albert G. Davis
Att'y.

No. 751,467. PATENTED FEB. 9, 1904.
F. B. COREY.
MOTORMAN'S VALVE.
APPLICATION FILED JUNE 18, 1903.
NO MODEL. 3 SHEETS—SHEET 2.

Witnesses:
George W. Tilden
Arlen Oxford

Inventor:
Fred B. Corey.
by Albert G. Davis
Att'y.

No. 751,467. PATENTED FEB. 9, 1904.
F. B. COREY.
MOTORMAN'S VALVE.
APPLICATION FILED JUNE 18, 1903.
NO MODEL. 3 SHEETS—SHEET 3.

Witnesses:
George H. Tilden.
Helen Orford

Inventor:
Fred B. Corey.
by Albert H. W. Davis
Atty.

No. 751,467.  
Patented February 9, 1904.

UNITED STATES PATENT OFFICE.

FRED B. COREY, OF SCHENECTADY, NEW YORK, ASSIGNOR TO GENERAL ELECTRIC COMPANY, A CORPORATION OF NEW YORK.

MOTORMAN'S VALVE.

SPECIFICATION forming part of Letters Patent No. 751,467, dated February 9, 1904.

Application filed June 18, 1903. Serial No. 162,023. (No model.)

*To all whom it may concern:*

Be it known that I, FRED B. COREY, a citizen of the United States, residing at Schenectady, in the county of Schenectady, State of New York, have invented certain new and useful Improvements in Motormen's Valves, of which the following is a specification.

My invention relates to valves employed by engineers and motormen for controlling the application and release of brakes in so-called "automatic" systems—that is, systems in which the brakes are applied by reductions in the pressure of the air in the train-pipe in contradistinction to systems in which the brakes are applied by increasing said pressure—and, generally stated, it comprises a valve structure in which the usual feed-valve and its operating mechanism are located directly beneath the main rotary valve and are inclosed therewith in a common casing in such a manner as to form, with the necessary communicating air-passages and connections, a compact structure. Two forms of such a valve structure are illustrated in the accompanying drawings, in which—

Figure 6:
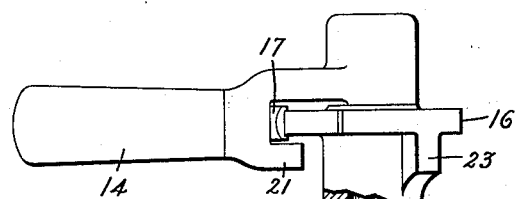
Figure 7:
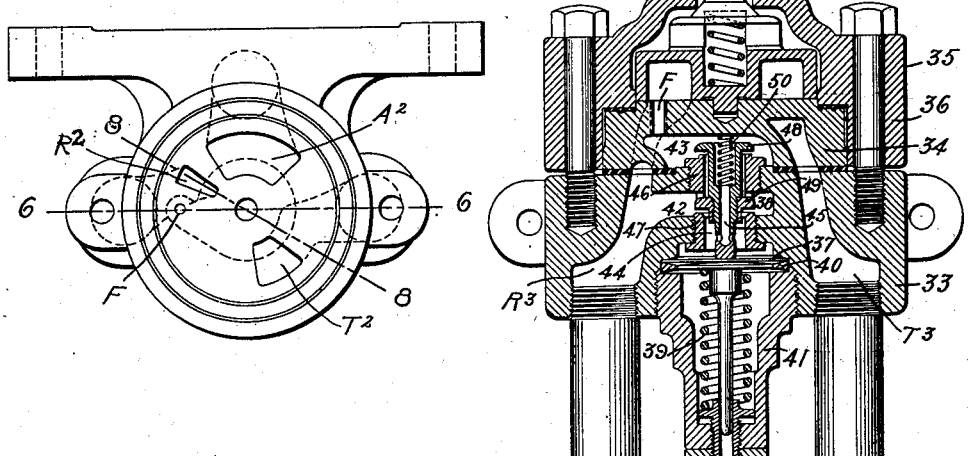
Figure 8:
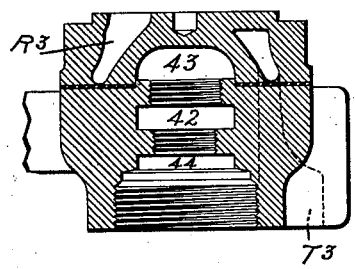
Figure 10:
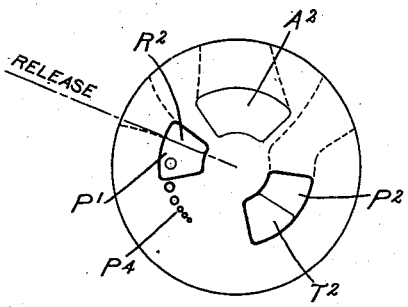
Figure 9:
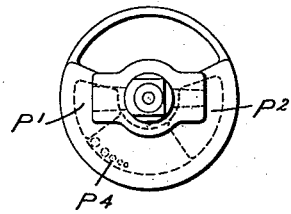

Figures 1 to 5, inclusive, illustrate one form, and Figs. 6 to 8, inclusive, the other. Of the figures illustrating the first form Fig. 1 is a vertical section of the complete valve structure. Fig. 2 is a plan view of the valve-bonnet, showing in broken lines the various positions of the valve-handle corresponding to different operative positions of the valve. Fig. 3 is a top view of the valve-body, the bonnet and rotary valve being removed. Fig. 4 is a vertical section of said body, taken on the line 4 4 of Fig. 3; and Fig. 5 is a similar section taken on the line 5 5 of Fig. 3. Of the figures illustrating the second form Fig. 6 is a vertical section of the complete structure. Fig. 7 is a top view with the bonnet and rotary valve removed; and Fig. 8 is a vertical section of the body and seat, taken on the line 8 8 of Fig. 7. Fig. 9 is a top view of the rotary valve and its stem, which are common to both forms; and Figs. 10 to 14, inclusive, are diagrammatic views illustrating the relative positions of the main valve and valve-seat ports in the various operative positions of said valve.

Each of these valve structures consists, essentially, of a central portion or body provided with suitable chambers and ports, a rotary valve seated upon the upper side of said body and adapted to coöperate with ports therein, a feed-valve located within the interior of said body, operating mechanism for said feed-valve located partly within said body and partly within a tubular extension at the lower side thereof, and a bonnet which incloses the rotary valve and completes the casing of the structure.

Referring to the drawings, in which like characters refer to like parts throughout the several views, and for the present to Figs. 1 to 5, inclusive, 10 designates the central or body portion of the valve structure, which is provided with main-reservoir, atmosphere, and train-pipe connections R A T at its lower side, which communicate through passages R' A' T' to the ports R² A² T² upon its upper face. These ports coöperate with the valve-ports P' and P² in the rotary valve 11 in the operation of charging and discharging the train-pipe. The rotary valve 11 is provided with a central projection 12, which engages a central socket in the upper face of the valve-body and which serves as a pivot about which the valve rotates. The valve is also provided with engaging lugs on its upper surface, which are adapted to engage with lugs at the lower end of the valve-spindle 13, which is suitably shaped at its upper end for the reception of the handle 14. A valve-bonnet 15 is bolted to the upper face of the body 10 and incloses the rotary valve 11. This bonnet has a flange 16 near its upper end, with which the pawl 17 on the handle 14 is adapted to engage to indicate to the motorman the various positions of the rotary valve. This is accomplished by the pawl 17 engaging the shoulders 18, 19, and 20 on said flange, and the extreme positions are indicated by the projection 21 on the under side of the handle engaging the stops 22 and 23. In order that the handle may be removed, a notch 24 is provided in the flange 16, through which the projection 21 may pass. The passages R' and T' in the valve-body are in direct communication with the pipes G' G², which extend upward and are adapted to be connected to a suitable pressure-gage. The interior of the central or body portion of the valve structure is provided with a chamber 25, which is in constant communication with the main reservoir through the passage R', as clearly illustrated in Fig. 5. Another chamber, 26, located within the interior of said body below the chamber 25, is adapted to be placed in direct communication with the train-pipe through the feed-port F and the ports of the rotary valve 11. A winged feed-valve 27 controls a passage between the chamber 25 and the chamber 26 and is operated by a well-known form of mechanism which comprises a piston 28, which is subjected to the train-pipe pressure in the chamber 26 on its upper side and to the pressure of a spring 29 on its under side. The usual flexible diaphragm 30 is composed of rubber or other suitable material which allows the piston considerable vertical movement. The spring 29 is coiled about the piston-rod 31, and both are inclosed within a tube 32, which is secured to the under side of the body 10 and forms a continuation of the valve structure. In the operation of this form of valve it will be seen that when the chamber 26 is in direct communication with the train-pipe the piston 28 will be pressed down slightly to compress the spring 29 and the feed-valve 27 will be closed. If, however, the pressure in the chamber 26 drops by reason of any leakage in the train-pipe or for other cause, the spring 29 will force the piston upward, and the upper end of the piston-rod 31 will engage the lower end of the valve 27 and open it, and air at main-reservoir pressure will then pass from the chamber 25 to the chamber 26 and thence to train-pipe and continue to pass until the pressure becomes sufficient to force the piston downward to the aforesaid balanced position.

Referring to that form of my invention shown in Figs. 6, 7, and 8, it may be noted that the location of the ports in the rotary valve-seat and the structure of the rotary valve are essentially the same as in the corresponding parts in the form previously described. Instead, however, of a single solid piece constituting the central portion of the structure there is in this form a body 33 and a separate piece 34, constituting the rotary valve-seat. The bonnet 35 is also slightly different in form, having an annular portion 36, which surrounds the valve-seat 34 and serves to hold it in place when the bonnet is bolted in place. In this form the main-reservoir, atmosphere, and train-pipe connections R A T are similarly connected to the under side of the body 33 and connect with the valve-seat ports R² A² T² through corresponding passages R³ A' T³ in the valve-body 33 and the seat 34. In this form of the invention, however, the feed-valve is somewhat different than that previously described and its working parts are smaller, so that this form of the invention is more compact. This difference is brought about by employing a sheet-metal diaphragm 37 instead of the flexible rubber diaphragm of the previous form. The metal diaphragm is capable of only a slight vertical movement, and consequently in order to provide a sufficiently large opening between the reservoir and train-pipe by way of the feed-valve it is necessary to provide a double-ported feed-valve 38. The spring 39, which acts on the under side of the piston 40, which bears against the diaphragm 37, is also smaller than the corresponding spring in the other form, and I am also enabled to employ a comparatively smaller inclosing tube 41 at the under side of the valve-body 33. The double feed-valve is located within the interior of the central portion of the valve structure, which comprises the body 33 and the seat 34 and is arranged to coöperate with three chambers—an intermediate chamber 42, which is in direct communication with the main reservoir through the passage R³, an upper chamber 43, and a lower chamber 44—which are in direct communication with each other through a vertical passage 45 in the double feed-valve 38. The feed-valve which controls passages between the intermediate chamber and said upper and lower chambers is provided with two seats 46 and 47, which are adapted to be engaged by two flanges 48 and 49, respectively. A spring 50 bears against the upper side of the valve and when unrestrained holds the flanges in contact with their seats. In the operation of this form of my invention it will be seen that when the valve-port P' overlies the port F, so as to bring the train-pipe and the chamber 43 into direct communication, any falling off of pressure in the train-pipe will be communicated immediately to the chamber 43 and thence through the passage 45 in the feed-valve to the chamber 44, and this will leave the spring 39 free to force the feed-valve open. Air at main-reservoir pressure may then pass from the chamber 42 by two paths to the chamber 43. One of these paths extends between the flange 49 and the seat 47 and thence through the passage 45 in the feed-valve to the chamber 43, and the other path extends between the lower face of the seat 46 and the flange 49 and thence upward between the interior of said seat and the exterior of the upper portion to the feed-valve and finally between the upper face of said seat and the flange 48 to the feed-valve. As in the previous case, compressed air will continue to flow from main reservoir to train-pipe until the train-pipe pressure has increased sufficiently to return the diaphragm 37 and its piston to their balanced position.

As is usual in valves of this type, the handle 14 can be removed only when the rotary valve is in the "lap" position, which occurs when the projection 21 on the under side of the handle is in line with the notch 24 in the flange 16. For all other positions of the rotary valve the projection 21 would interfere with the flange 16 if it were attempted to remove the handle. In the lap position, which is that indicated in Fig. 13, none of the ports in the valve register or overlap the ports in the valve-seat, so that all communication between the train-pipe, main reservoir, and atmosphere is cut off. In the operation of the aforesaid valves when all air is off the system the feed-valve will be open, so that as soon as the compressor is started to bring the main reservoir up to pressure compressed air will be fed to all the chambers in the central portion of the structure, and when the pressure on the upper side of the feed-valve piston has increased sufficiently it will compress its spring and allow the feed-valve to close in the manner previously set out. With the chambers thus charged if it is desired to start the car or train the handle is placed in position on the valve-stem in the manner previously described and the valve is removed from lap to "release" position. When the latter position is reached, it is indicated to the motorman by the pawl 17 engaging the shoulder 18 on the flange 16 and the projection 21 engaging the stop 22. In this position of the valve the ports $P'$ and $P^2$ register with the seat-ports $R^2$ and $T^2$, thus connecting the train-pipe to the main reservoir through a wide opening, and compressed air will rush into the train-pipe from the main reservoir.

In the usual operation the rotary valve will be retained in the release position only for a sufficient time to allow the pressure of the air in the train-pipe to rise sufficiently to actuate the triple valves and release the brakes, and after this it will be returned to the "running" position, in which any small deficiency of pressure that may exist will be made up.

Figure 11:
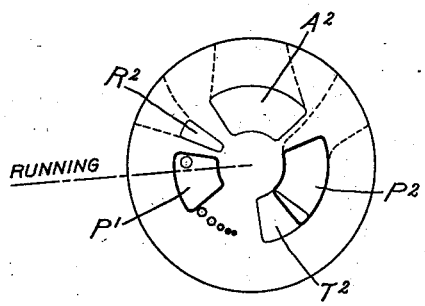
Figure 12:
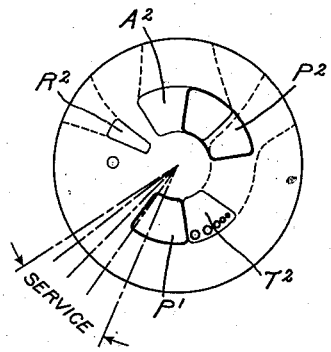
Figure 13:
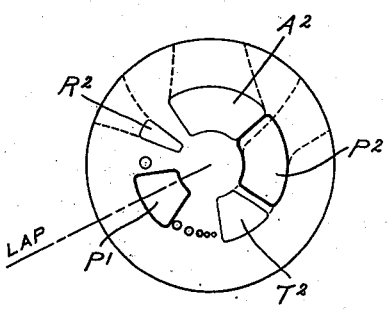

In the running position the port $P'$ will lie directly above the seat-port F and the port $P^2$ will only slightly overlap the port $T^2$, as is clearly illustrated in Fig. 11, so that all air which enters the train-pipe must pass through the passage controlled by the feed-valve. In this operation, as previously indicated, the train-pipe pressure is balanced against the piston-spring, so that whenever the pressure in the train-pipe is below normal the feed-valve is opened and air flows from the main reservoir to the train-pipe and continues to flow until the pressure is restored. Thus the train-pipe is automatically fed and the pressure maintained normal as long as the main valve remains in the running position. In moving the valve from the release to the running position the latter position is indicated to the motorman or engineer by the engagement of the pawl 17 of the handle with the shoulder 19 of the flange 16.

Figure 14:
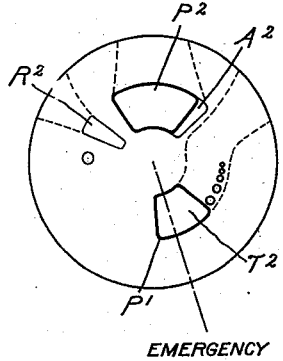

When it is desired to make an ordinary service application of the brakes, the valve-handle is moved from the running position beyond the lap position until one or more of the ports $P^4$ comes directly above the train-pipe port $T^2$ and the valve-port $P^2$ overlaps the atmospheric port $A^2$. This will provide a passage, more or less constricted, between train-pipe and atmosphere and air will escape with sufficient rapidity to actuate the triple valves and produce the necessary application of the brakes. The degree of application will depend upon the number of ports $P^4$ which overlie the train-pipe port $T^2$. When the most severe service application is obtained, the ports will be in the position indicated in Fig. 12, and in reaching such position the pawl 17 on the handle will strike the shoulder 20 on the flange 16, and thus indicate to the motorman that further movement is unnecessary for an ordinary application. Finally, if it is desired to make an emergency application of the brakes the handle 14 is thrown around to the extreme right until the projection 21 engages the stop 23. In this position of the valve, which is indicated in Fig. 14, the valve-ports $P'$ and $P^2$ register with the train-pipe port $T^2$ and atmospheric port $A^2$, respectively, thus providing a wide opening between train-pipe and the atmosphere, through which air may escape with sufficient rapidity to produce a sudden and strong application of the brakes. After either a service or emergency application the brakes are released by moving the handle around to the release position and subsequently to the running position after charging the train-pipe to release the brakes in the manner previously described.

The particular feed-valve and feed-valve-operating mechanism illustrated in Fig. 6 constitutes no part of my invention, but forms the subject-matter of application, Serial No. 169,577, filed August 16, 1903, by George Macloskie.

What I claim as new, and desire to secure by Letters Patent of the United States, is—

1. In a controlling-valve for air-brake systems, a valve structure comprising a valve-seat provided with suitable ports, a rotary valve mounted on the top of said seat, a chamber directly beneath the valve-seat supplied with air at main-reservoir pressure, and an automatic feed-valve for controlling the flow of air from said chamber to the train-pipe, the said valve having its operating parts inclosed in a casing located directly beneath said chamber and forming a continuation of the said valve structure.

2. In a controlling-valve for air-brake systems, a valve structure comprising a rotary valve provided with suitable ports for controlling the passage of air to and from the train-pipe, a chamber beneath said rotary valve permanently connected to the main reservoir, and an automatic feed-valve for controlling the flow of air from said chamber to the train-pipe, the said valve having its operating parts inclosed in a casing located directly beneath the rotary valve and forming a continuation of the said valve structure.

3. In a controlling-valve for air-brake systems, a valve structure comprising a rotary valve provided with suitable ports for controlling the passage of air to and from the train-pipe, a central or body portion located directly beneath said rotary valve and forming the rotary valve-seat, main reservoir, atmosphere and train-pipe connections at the lower side of said central portion, a chamber beneath said rotary valve permanently connected to the main reservoir, and an automatic feed-valve for controlling the flow of air from said chamber to the train-pipe, the said valve having its operating parts inclosed in a casing located directly beneath said chamber and forming a continuation of the said valve structure.

In witness whereof I have hereunto set my hand this 16th day of June, 1903.

FRED B. COREY.

Witnesses:
BENJAMIN B. HULL,
HELEN ORFORD.